Figure 1:
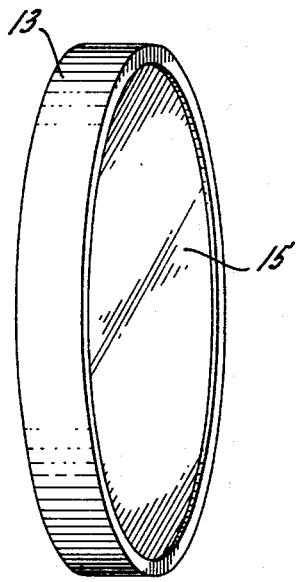

Oct. 4, 1966    F. J. SCHOENEWEIS    3,276,911
FUEL CELL ELECTRODES AND METHOD FOR MAKING SAME
Filed Dec. 16, 1964

INVENTOR.
F. J. Schoeneweis,
BY
H. H. Locke
Paul S. Collignon ATT'YS.

United States Patent Office 3,276,911
Patented Oct. 4, 1966

3,276,911
FUEL CELL ELECTRODES AND METHOD
FOR MAKING SAME
Frederick J. Schoeneweis, Santa Clara, Calif., assignor, by mesne assignments, to the United States of America as represented by the Secretary of the Navy
Filed Dec. 16, 1964, Ser. No. 418,932
1 Claim. (Cl. 136—120)

The present invention relates to fuel cell electrodes, and method for making same, and is particularly related to the fabrication of porous catalytic electrodes for use as fuel and oxygen electrodes of a fuel cell for the electrochemical oxidation of fuels.

A fuel cell is an electrochemical cell in which the free energy of combustion of the fuel is converted directly into electrical energy. A simple cell comprises a housing, a fuel electrode, an oxidizing electrode, and an external means for drawing off electrical current. An oxidizing gas such as oxygen is passed through, or on one side of the oxidizing electrode and a fuel gas is passed through, or on one side of the fuel gas electrode. The oxidizing gas is adsorbed in the pores of the oxygen electrode and de-adsorbed therefrom migrating as O— ions into the electrolyte leaving behind two positive charges. The fuel gas is similarly adsorbed and de-adsorbed from the pores of the fuel electrode migrating into the electrolyte as H+ ions, in the case of hydrogen fuel, leaving behind a negative charge. The positive and negative ions unite to form a neutral molecule in the solution while the charges on the electrodes are utilized as electrical energy. In the case of the O—— and H+ ions, the neutral molecule is water.

The basic problem in making an efficient fuel cell is essentially one of chemical kinetics, the object being to carry out the reaction of a fuel gas and an oxidizing gas in such a manner that the proportion of free energy degraded into heat is as small as possible. At the same time, reaction rates must be high enough so that sufficient output from practical sized cells can be economically attained. One particular aim of modern research is the development of an efficient electrochemically stable electrode which is not detrimentally attacked, even at high temperaures, by the electrolyte of the cell.

Heretofore, the electrodes of fuel cells have their surfaces exposed to the electrolyte and the catalytic surfaces of the electrodes become poisoned quite rapidly.

In the present invention, a pair of metal disks of powdered materials are each impregnated with a catalytic material selected from group VIII of the periodic table. The catalytic material is then converted to an oxide either by heating or by reducing in hydrogen to provide an active metallic surface. Two disks are then placed and held together with their active metallic surfaces in contact.

It is therefore a general object of the present invention to provide an improved electrode for use in a fuel cell.

Another object of the present invention is to provide an electrochemically stable electrode for a fuel cell.

Still another object of the present invention is to provide a fuel cell electrode that will not be poisoned by the electrolyte.

Figure 2:
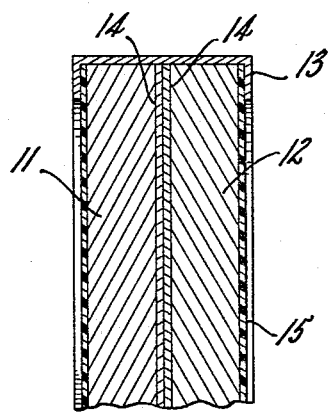
Figure 2:
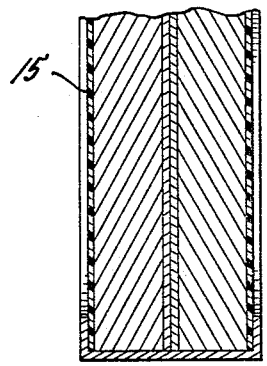

Other objects and advantages of the present invention will be readily appreciated as the same becomes better understood by reference to the following detailed description when considered in connection with the accompanying drawing wherein:

FIGURE 1 is a perspective view of a fuel cell electrode; and
FIGURE 2 is an enlarged sectional of FIGURE 1.

Referring now to the drawing, there is shown a fuel cell electrode comprised of two flat circular disks 11 and 12 that are held in contact with one another by metallic ring 13. Disks 11 and 12 are made of a powdered metal, such as nickel or iron, and preferably of a size range of between 200 and 350 mesh. The powdered metal is pressed to the desired shape and then sintered at a temperature of between 1000 and 1500 degrees C.

Next, the porous electrode body is impregnated with a catalytic material 14 selected from group VIII of the periodic table as taught by James E. McEvoy and Harold Shalit, in United States Patent 3,097,974, patented July 16, 1963. This patent teaches that a noble metal catalyst component is impregnated in the porous base material by forming a slurry which is applied to the base material and then dried. By way of example, when palladium is used as the catalytic material, a slurry of palladium chloride is prepared and applied to the porous base material and, after drying, the noble metal is obtained by reduction, as by passing hydrogen or methanol over the powder.

A liquid semi-sealant coating 15 is applied to the surface of the electrode that comes into contact with the electrolyte. Such coatings are semi-sealant in the sense that they seal the catalytic metal but are permeable to ionic and electrolytic transport in the fuel cell system. Such coating agents are chosen to have the maximum stability in the environment of use and may be such as silicone polymers, fluorocarbons, polystyrenes and the like in a suitable solvent. For example, such a coating applied to an electrode may be a ½% solution of methyl methacrylate in acetone. Such a coating is reasonably stable in electrolytes and has little, if any, effect on the utility of the electrode.

As best shown in FIGURE 2 of the drawing, a pair of disks 11 and 12 are placed together with their active surfaces 14 in contact and operate as a catalyst, however, the catalytic surfaces are not exposed to the electrolyte and are not poisoned thereby. While the drawing shows that disks 11 and 12 are held in contact by ring 13, these disks can also be pressed together or glued together.

It can thus be seen that the present invention provides an improved fuel cell electrode that is protected from the adverse effect of an electrolyte. Obviously many modifications and variations of the present invention are possible in the light of the above teachings. It is therefore to be understood, that within the scope of the appended claim, the invention may be practiced otherwise than as specifically described.

What is claimed is:
A fuel cell electrode adaptable for use in an electrolyte comprising:
first and second permeable disks of sintered metal each having one surface impregnated with a catalytic metal, said impregnated surfaces being in contact with one another, and
a semi-sealant material coating all portions of said first and second disks other than said impregnated surfaces whereby said semi-sealant material prevents said electrolyte from permeating said first and second disks but permits permeation of said disks by gaseous fuels and oxidizers.

References Cited by the Examiner
UNITED STATES PATENTS

| 1,601,036 | 9/1926 | Nyberg | 136—121 |
| 2,666,802 | 1/1954 | Woodring et al. | 136—120 |

WINSTON A. DOUGLAS, Primary Examiner.
A. SKAPARS, Assistant Examiner.